United States Patent [19]

Carter et al.

[11] 4,078,607
[45] Mar. 14, 1978

[54] OIL RECOVERY PROCESS USING IMPROVED THICKENED AQUEOUS FLOODING LIQUIDS

[75] Inventors: Walter H. Carter, Houston; Charles A. Christopher, Stafford; Thomas Jefferson, Houston, all of Tex.

[73] Assignee: Texaco Inc., New York, N.Y.

[21] Appl. No.: 722,996

[22] Filed: Sep. 13, 1976

[51] Int. Cl.² .......................................... E21B 43/22
[52] U.S. Cl. .................... 166/246; 166/273; 166/274
[58] Field of Search ............. 166/246, 273, 274, 275; 252/8.5 A, 8.5 C, 8.55 D

[56] References Cited

U.S. PATENT DOCUMENTS

| | | | |
|---|---|---|---|
| 3,305,016 | 2/1967 | Lindblom et al. | 252/8.55 D X |
| 3,319,715 | 5/1967 | Parks | 252/8.5 C |
| 3,581,824 | 6/1971 | Hurd | 166/273 X |
| 3,707,187 | 12/1972 | Knight | 166/273 X |
| 3,765,918 | 10/1973 | Jordan et al. | 252/8.5 C X |
| 3,888,309 | 6/1975 | Raudy et al. | 166/274 |
| 3,908,760 | 9/1975 | Clampitt et al. | 166/246 |
| 3,946,812 | 3/1976 | Gale et al. | 166/273 X |

*Primary Examiner*—Stephen J. Novosad
*Assistant Examiner*—George A. Suchfield
*Attorney, Agent, or Firm*—Thomas H. Whaley; Carl G. Ries; Kenneth R. Priem

[57] ABSTRACT

The specification discloses a process for recovering oil from a subterranean reservoir which process utilizes a thickened flooding liquid containing polysaccharide B-1459. In the process the polysaccharide B-1459 is imparted with superior viscosity by first prehydrating it with fresh or deionized water before mixing with another aqueous component, for example brine water containing large amounts or inorganic ions, that is, hard water. The invention comprises the polysaccharide B-1459 which has been prehydrated in the fresh or deionized aqueous medium and then mixed with hard water. The process for imparting viscosity to polysaccharide B-1459 is an improvement over the prior art in that a higher viscosity is obtained while using the same amount of polysaccharide that has been obtained by hydrating the polysaccharide in hard or brine water initially.

10 Claims, 3 Drawing Figures

× 1ST. METHOD    △ 2ND. METHOD

⬡ 1,000 g/m³ (1ST. METHOD)   ◇ 1,000 g/m³ (2ND. METHOD)
△ 500 g/m³ (1ST. METHOD)   ⌂ 500 g/m³ (2ND. METHOD)

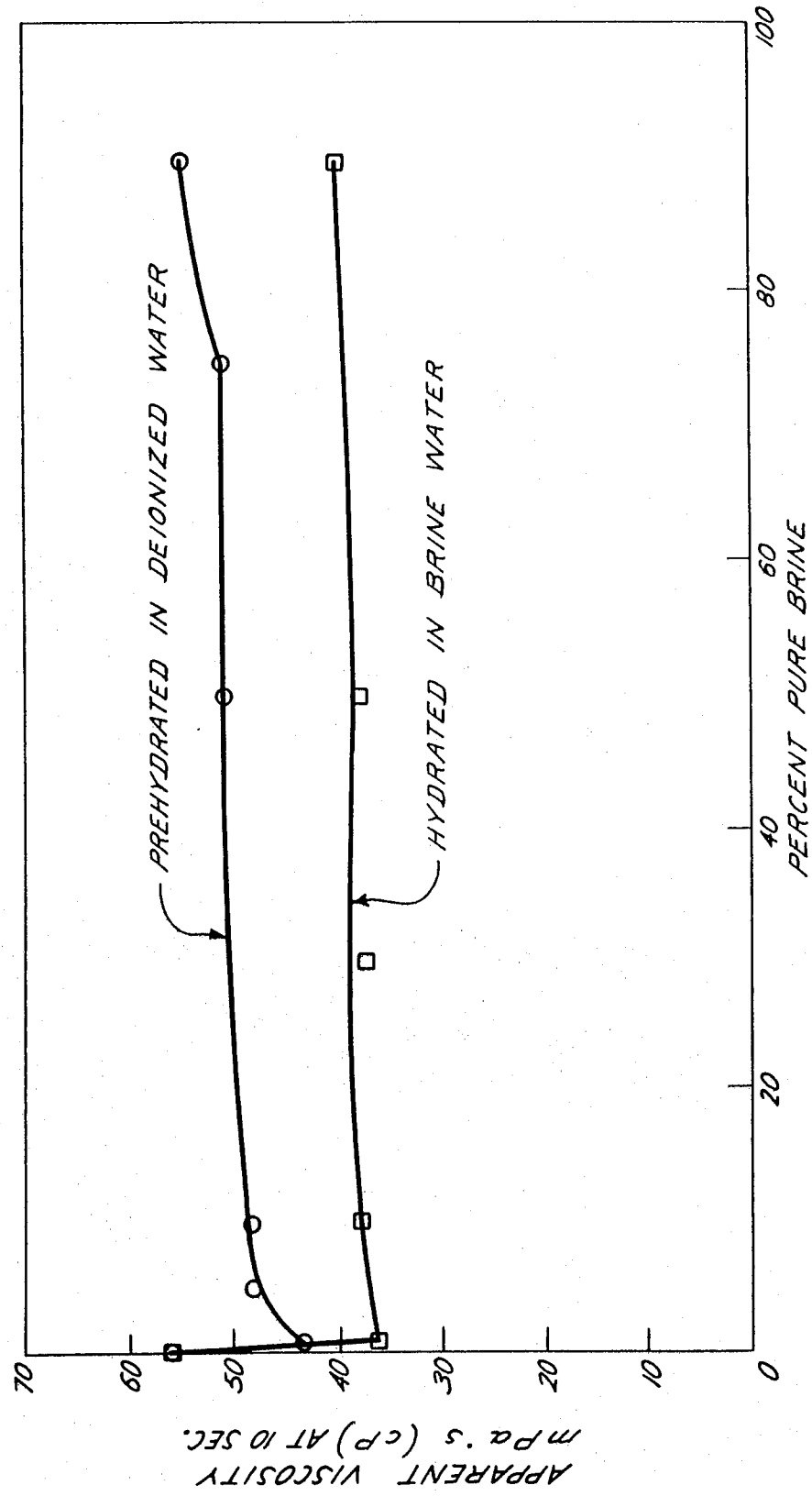

OIL RECOVERY PROCESS USING IMPROVED THICKENED AQUEOUS FLOODING LIQUIDS

BACKGROUND OF THE INVENTION

The present invention relates to the recovery of oil from subterranean reservoirs and more particularly relates to a process of improving the sweep efficiency of a waterflood, oil recovery operation.

The use of a "waterflood" operation to recover oil from subterranean reservoirs is well known in the petroleum production art. A typical waterflood involves injecting an aqueous flooding liquid, e.g., water, into a reservoir to drive oil through the reservoir toward one or more production wells from which it can be produced to the surface. Unfortunately, the injected water has a tendency to channel through certain portions of the reservoir while completely bypassing others. This inability of the water to "sweep" substantial areas within the reservoir seriously affects the ultimate recovery of oil and detracts from the economical attractiveness of such operations. Accordingly, the need to improve the sweep efficiency of waterfloods has long been apparent.

Early research revealed that poor sweep efficiency can be attributed to several factors. One is the natural tendency of a liquid to flow in the path of least resistance; hence, the water flows through the highly permeable portions of the reservoir more readily than through the less permeable portions. Another factor involves the differences between the mobilities of the injected water and the oil in the reservoir. In both instances, the sweep efficiency of a waterflood can be improved by increasing the viscosity of the injected water.

Past techniques for increasing the viscosity of flood water have included incorporating water-soluble thickening additives into the water. Additives that have been suggested for this purpose include a wide variety of naturally occurring gums, sugars, and polymers. One of the most promising groups of such thickeners is the ionic polysaccharides, particularly the polysaccharide prepared by employing bacteria of the genus Xanthomonas and commonly referred to as polysaccharide B-1459.

This invention provides a method whereby the viscosity of a polysaccharide solution may be increased with no additional use of chemical.

SUMMARY OF THE INVENTION

The present invention is a method for recovering oil from a subterranean reservoir having injection and production means wherein an aqueous polysaccharide solution is injected into the reservoir via the injection means and oil is produced from the production means. The invention comprises imparting superior viscosity to the aqueous polysaccharide solution by prehydrating the polysaccharide in fresh deionized water before mixing with an aqueous component comprising hard water.

DESCRIPTION OF THE PREFERRED EMBODIMENTS

Figure 1:
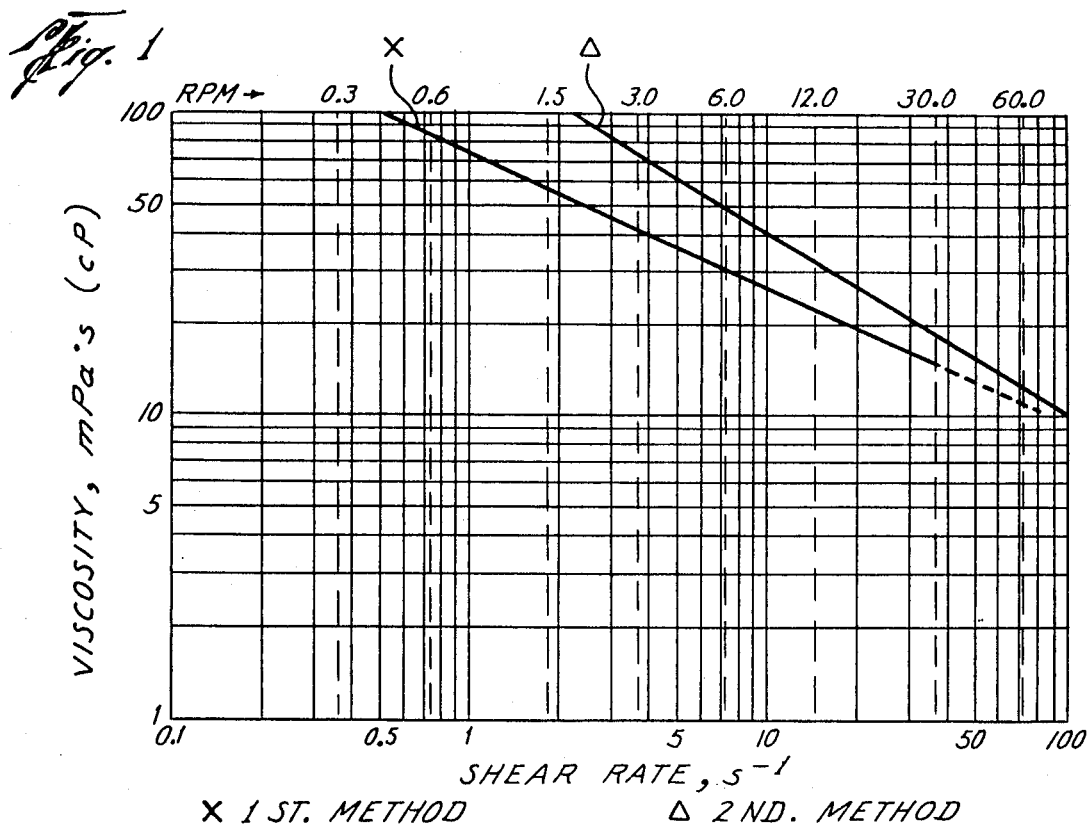

In accordance with the present invention, there is provided a new and improved process for recovering oil from a subterranean reservoir penetrated by spaced injection and production systems which define a recovery zone. As will be understood by those skilled in the art, the term "recovery zone" as used herein means that portion of the reservoir through which oil is displaced from the injection system to the production systems may comprise one or more wells extending from the surface of the earth into the recovery zone and such wells may be located and spaced from one another in any desired pattern. For example, the so-called "line flood" pattern may be utilized, in which case the injection and production wells are located in rows extending generally parallel to one another. Other arrangements which may be used include those in which a central injection well is surrounded by a plurality of production wells. Such an arrangement may be a five-spot, seven-spot, nine-spot, or other similar pattern.

In the present invention, oil is to be recovered from a recovery zone by means of a waterflooding operation wherein the aqueous flooding liquid, e.g., water, has been thickened by the addition of an ionic polysaccharide selected from the group of heteropolysaccharides prepared by employing the bacteria of the genus Xanthomonas. Of these heteropolysaccharides, the polysaccharide B-1459 is preferred. Polysaccharide B-1459 contains d-glucose, d-mannose, and d-glucuronic acid groups in the ratio to 2.8:3.0:2.0. It also contains about 3 to about 3.5 percent by weight pyruvic acid and about 4.7 percent by weight of acetic acid. The acetic acid exists as the O-acetyl ester, whereas the pyruvic acid is attached through a ketal linkage. The polysaccharide B-1459 is produced by culturing bacterium *Xanthomonas campestris* NRRL B-1459 United States Department of Agriculture, on a well-aerated medium having a pH of about 7 containing commercial glucose, organic nitrogen sources, dipotassium hydrogen phosphate, and appropriate trace elements. The preferred fermentation temperature during the culturing is about 28° C. The fermentation reaction is complete in about 96 hours or less. Bacterial cells and suspended impurities are removed from the fermentation product by centrifugation after adjusting the pH to from 5 to 6. The polysaccharide B-1459 is precipitated from the centrifuged fermentation product by adding salt and a low molecular weight alcohol thereto.

The polysaccharide B-1459 is now a relatively standard product. Its molecular weight is estimated to be in the millions. This polysaccharide is commercially available under the trade name "Xanflood" from the "Xanco" Company, San Diego 92123. It was formerly called "Kelzan".

The terms fresh water and hard water as used herein are by their nature inprecise and useful only to simplify the explanation of the invention. The definition of these terms depend on the specific situation encountered. In our invention polysaccharide B-1459 is first prehydrated in fresh water, and then this prehydrated product is mixed with hard water to form a solution of polysaccharide having superior viscosity compared with the same amount of polysaccharide initially hydrated in hard water. Laboratory studies (See Example VIII) have shown that this method works best when the fresh water prehydration step is done in water containing below about 15,000 g/m$^3$ of total inorganic ions (cations and anions) including monovalent and divalent ions typically Na$^+$, Ca$^{++}$ and/or Mg$^{++}$. Therefore, fresh water is water which will prehydrate the polysaccharide to yield a polysaccharide solution in hard water of higher viscosity than hydrating directly in hard water. Deionized water contains no appreciable inorganic ions. Hard water or brine as used herein is water having these inorganic ions present in amount well above what is considered fresh water, for example, about 20,000 g/m³. Since it is clear that experimentors armed with the basic teachings of this disclosure may find variation from brine to brine using the same principles, these values are not intended to limit the scope of the invention but are included for disclosing the full amount of information which present data teaches.

It is also an advantage of our invention that the solution of polysaccharide B-1459 which has been prehydrated with fresh water flows more readily in a porous media such as a subterranean hydrocarbon reservoir matrix than does a solution of polysaccharide hydrated initially in brine which often plugs the porous media.

EXPERIMENTAL

The following data will demonstrate that the method of this invention imparts superior viscosity to polysaccharide solutions. The data will also indicate that the same method applied to other polysaccharides and to polyacrylamide solutions does not improve the viscosity characteristics.

EXAMPLE I

This example demonstrates the method of this invention. Solutions of 1.0 Kg/m³ polysaccharide B-1459 were prepared in Manvel brine by two methods. The first method consisted of hydrating polysaccharides directly in Manvel brine. The second method consisted of prehydrating polysaccharide in deionized water and then diluting with Manvel brine.

The first method comprised adding 0.5 grams of polysaccharide to 500 cubic centimeters of Manvel brine being stirred in a Waring blender for about thirty minutes. The resulting solution's viscosity profile is presented in FIG. I.

The second method comprised prehyrating 5.0 grams of polysaccharide in 500 cubic centimeters of deionized water. A 50 gram aliquot was diluted with 450 cubic centimeters of Manvel brine containing about 106,000 g/m³ of total dissolved inorganic ions including 38,900 g/m³ of $Na^+$, 1810 g/m³ of $Ca^{++}$ and 612 g/m³ of $Mg^{++}$. and placed in a container. This container was shaken twenty-five times to simulate the action of an inline static mixer. This solution's viscosity profile is presented in FIG. I also.

It may be concluded from FIG. I that both methods produced homogeneous solutions containing no conglomerate particles of polysaccharide. However, the highest viscosity was obtained from the prehydrated polysaccharide in deionized water (second method).

EXAMPLE II

In this example polysaccharide B-1459 was ultimately made into solution with Walpole brine. Walpole Brine has the following amounts of dissolved inorganic ions: $Na^+$ = 38,157, g/m³; $Ca^{++}$ = 4,700, g/m³; and $Mg^+$ = 1,480, g/m³ with about 116,000 g/m³ of total dissolved inorganic ions. Two methods were used to prepare polysaccharide solutions of 1000 gm/m³ and 500 gm/m³ of polysaccharide.

The first method comprised adding 0.6 grams and 0.3 grams of polysaccharide to two 600 ml. solutions of Walpole brine being stirred in a Waring blender.

Figure 2:
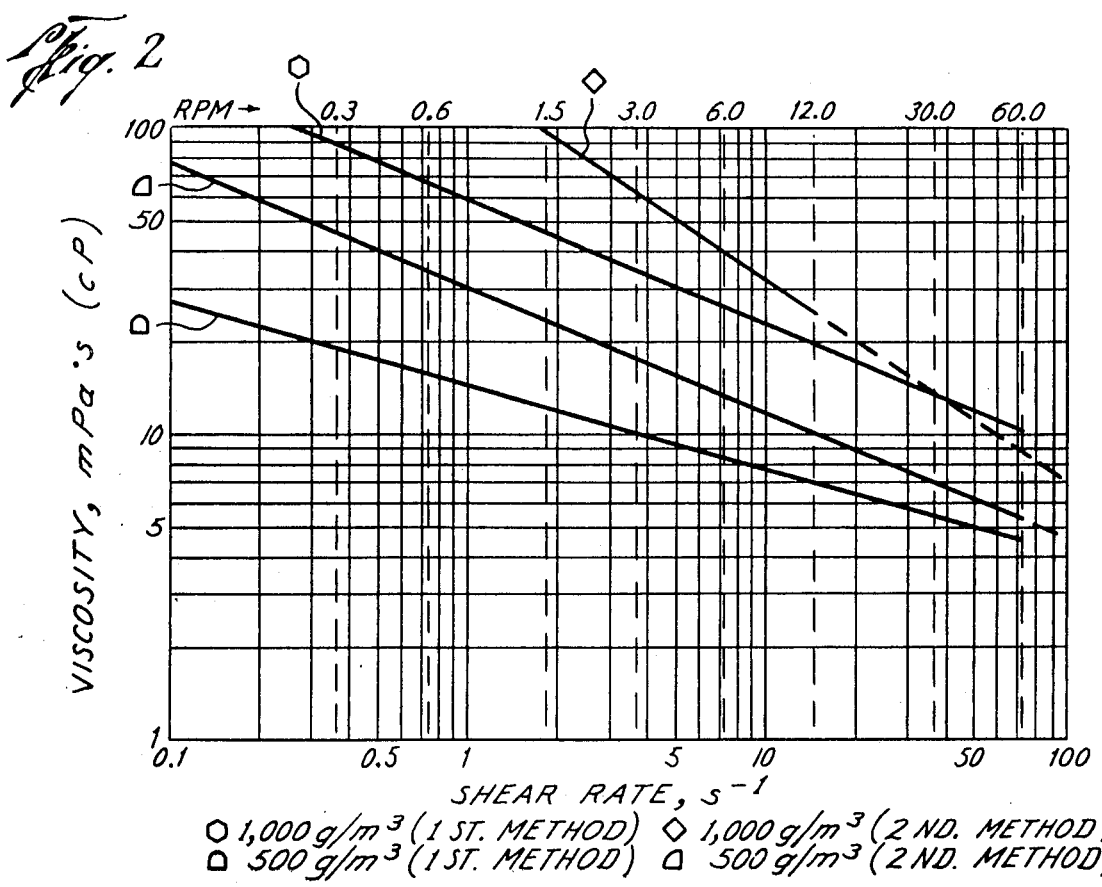

The second method comprised prehydrating 5.0 grams of polysaccharide in 500 cubic centimeters of deionized water. A 40 gram and 20 gram aliquot was diluted with 360 and 380 cubic centimeters respectively of Walpole brine and placed in a container. This container was shaken 25 times to simulate the action of a static mixer. The solution viscosities are depicted on FIG. 2. Both methods produced homogeneous solutions. However, the prehydration of polysacharide with deionized water (second method) is obviously the optimum method to yield the highest viscosity in the ultimate aqueous solution.

EXAMPLE III

Example III depicts the effects of various salt concentrations on the viscosities of polysaccharide B-1459 solutions which have been prehydrated in deionized water and those hydrated initially in hard water containing high concentrations of inorganic ions. The pure brine in this Example has about 203,000 and g/m³ of dissolved inorganic ions including about 68,000 g/m³ of $Na^+$, 9,120 g/m³ of $Ca^{++}$ and 1,390 g/m³ of $Mg^{++}$. As may be seen from FIG. 3 the viscosity of the deionized water prehydrated polysaccharide display higher viscosities than those hydrated directly in the various concentrations of brine.

EXAMPLE IV

This example shows that the method of the invention does not work with polyacrylamide polymer. In this experiment solutions of polyacrylamide were prepared in deionized and in fresh water as well as in brine containing a high concentration of inorganic ions. After these solutions were prepared the viscosity was measured and recorded. Table I gives the results of these experiments.

The deionized water contained no appreciable inorganic salts. The fresh water contained 500 g/m³ NaCl and 400 g/m³ $CaCl_2.2H_2O$. The brine contain 100,000 g/m³ of NaCl and 15,000 g/m₃ $CaCl_2.2H_2O$.

TABLE I

| | | VISCOSITY, (UNITS) |
|---|---|---|
| A) | Prehydrated indeionized water then diluted with brine. | 6.8 |
| B) | Prehydrated with fresh water then diluted with brine. | 6.8 |
| C) | Hydrated directly in an 80/20 mixture of brine and fresh water. | 6.7 |
| D) | Hydrated directly in 100% brine. | 6.7 |

EXAMPLE V

Two polysaccharides other than B-1459 were prehydrated in deionized water and then mixed with brine (hard) water. Those polysaccharides, guargum and hydroxyethylcellulose, did not show an improvement in viscosity compared to other solutions of those materials prepared by initially hydrating them in brine (hard) water.

EXAMPLE VI

This example illustrates that time of hydration of polysaccharide B-1459 does not play a significant role in the viscosity of the final solution but that prehydration in fresh water is the key to higher viscosity.

| | VISCOSITY IN mPa-s(cp), $10s^{-1}$ | |
|---|---|---|
| DAYS | B-1459 HYDRATED DIRECTLY IN BRINE | PREHYDRATED B-1459 IN FRESH WATER* PRIOR TO ADDITION OF BRINE |
| 1 | 24 | 42 |
| 29 | 24 | 42 |

-continued

| | VISCOSITY IN mPa-s(cp), 10s$^{-1}$ | |
|---|---|---|
| DAYS | B-1459 HYDRATED DIRECTLY IN BRINE | PREHYDRATED B-1459 IN FRESH WATER* PRIOR TO ADDITION OF BRINE |
| 515 | 24 | 35 |

*Contains 130 g/m$^3$ of inorganic ions

EXAMPLE VII

A linear limestone core having a length of 17.7 cm and a diameter of 5.08 cm, a permeability of 98.5 md and an original oil saturation (So) of about 0.68 was first water flooded to an oil saturation (Sow) of 0.334. Then the core was flooded with an aqueous solution containing surfactants and sodium lignosulfonate. This solution was followed by an aqueous brine solution of 1000 g/m$^3$ of polysaccharide B-1459 which had been prepared by prehydrating the polysaccharide in fresh water and then mixing it with brine containing about 82,000 g/m$^3$ total dissolved inorganic ions including about 20,300 g/m$^3$ of Na$^+$, 6,649 g/m$^3$ of Ca$^{++}$ and 2,530 g/m$^3$ of Mg$^{++}$.

The final oil saturation in the core (Sor) was 0.143. Therefore, the tertiary system using the polysaccharide solution produced 57% of the oil in place (OIP) after the water flood.

EXAMPLE VIII

The following data shows the effect of prehydration with water containing varying amounts of inorganic ions. The polysaccharide B-1459 was prehydrated in each of the aqueous solution containing from zero to 55,500 g/m$^3$ of inorganic ions. The prehydrated concentrate was the mixed with pure brine containing 111,000 g/m$^3$ of dissolved inorganic ions with a Ca$^{++}$/Na$^+$ ratio of 1 to 9.

| PREHYDRATION WATER | | FINAL VISCOSITY IN BRINE |
|---|---|---|
| 0.0 | g/m$^3$ inorganic ions | 49.0 |
| 555 | g/m$^3$ inorganic ions | 45.5 |
| 1,100 | g/m$^3$ inorganic ions | 45.0 |
| 5,550 | g/m$^3$ inorganic ions | 42.0 |
| 11,000 | g/m$^3$ inorganic ions | 39.5 |
| 55,500 | g/m$^3$ inorganic ions | 35.0 |
| 111,000* | g/m$^3$ inorganic ions | 35.0 |

*Pure Brine

EXAMPLE IX

To illustrate that a brine solution of polysaccharide B-1459 prehydrated in deionized water flows more readily through a porous media that a solution of polysaccharide hydrated directly in brine the following experiment was performed.

Two polymer solutions of polysaccharide B-1459 at 1000 g/m$^3$ were filtered through a nuclepore filter medium 5.0 pore size at 20 psi pressure differential. This test provides a relative measure of the fluid injectivity. One polymer solution was prehydrated in deionized water and the other was hydrated directly in the same brine containing 111,000 g/m$^3$ of dissolved inorganic ions.

The prehydrated polymer solution passed through the filter medium much more readily. For example after 80 seconds the polymer solution hydrated directly in brine was almost plugged having passed only 50 cm$^3$ of liquid through the filter. It ultimately only passed about 60 cm$^3$ before completely plugging. At 80 seconds the prehydrated polymer solution had passed 160 cm$^3$ and ultimately passed 180 cm$^3$.

I claim:

1. In a method for recovering oil from a subterranean reservoir having injection and production means wherein an aqueous polysaccharide B-1459 solution is injected into the reservoir via the injection means and oil is produced from the production means the improvement which comprises using a superior aqueous polysaccharide solution made by prehydrating the polysaccharide in fresh water and then mixing this prehydrated solution with hard water whereby said prehydration step yields a polysaccharide solution in hard water of higher viscosity than hydrating directly in hard water.

2. A method in claim 1 wherein the fresh water contains inorganic ions in concentrations below about 15,000 g/m$^3$.

3. A method as in claim 1 wherein the fresh water contains inorganic ions in concentrations below about 6,000 g/m$^3$.

4. A method as in claim 1 wherein the polysaccharide solution is preceded by a water drive.

5. In a method for recovering oil from a subterranean reservoir having injection and production means wherein a surfactant solution is injected into the reservoir via the injection means followed by an aqueous polysaccharide B-1459 solution and oil is produced from the production means the improvement which comprises injecting a superior aqueous polysaccharide solution made by prehydrating the polysaccharide in fresh water and then mixing this prehydrated solution with hard water whereby said prehydration step yields a polysaccharide solution in hard water of higher viscosity than hydrating directly in hard water.

6. A method as in claim 5 wherein the fresh water contains inorganic ions in concentrations below about 15,000 g/m$^3$.

7. A method as in claim 5 wherein the fresh water contains inorganic ions in concentrations below about 6,000 g/m$^3$.

8. In a method for recovering oil from a subterranean reservoir having injection and production means wherein an aqueous polysaccharide B-1459 solution is injected into the reservoir via the injection means and oil is produced from the production means the improvement which comprises using a superior aqueous polysaccharide solution made by prehydrating the polysaccharide in deionized water and then mixing this prehydrated solution with hard water whereby said prehydration step yields a polysaccharide solution in hard water of higher viscosity than hydrating directly in hard water.

9. A method as in claim 8 wherein the polysaccharide solution is preceded by a water drive.

10. In a method for recovering oil from a subterranean reservoir having injection and production means wherein a surfactant solution is injected into the reservoir via the injection means followed by an aqueous polysaccharide B-1459 solution and oil is produced from the production means the improvement which comprises using a superior aqueous polysaccharide solution made by prehydrating the polysaccharide in deionized water and then mixing this prehydrated solution with hard water whereby said prehydration step yields a polysaccharide solution in hard water of higher viscosity than hydrating directly in hard water.

* * * * *